US006180756B1

(12) United States Patent
Burch

(10) Patent No.: US 6,180,756 B1
(45) Date of Patent: Jan. 30, 2001

(54) ADDITION OF TREATMENT AGENTS TO SOLID PHASE POLYMERIZATION PROCESS

(75) Inventor: Robert Ray Burch, Exton, PA (US)

(73) Assignee: E. I. du Pont de Nemours and Company, Wilmington, DE (US)

( * ) Notice: Under 35 U.S.C. 154(b), the term of this patent shall be extended for 0 days.

(21) Appl. No.: 09/505,045

(22) Filed: Feb. 16, 2000

Related U.S. Application Data

(60) Provisional application No. 60/120,393, filed on Feb. 17, 1999.

(51) Int. Cl.$^7$ .................................................. C08F 6/00
(52) U.S. Cl. ...................... 528/486; 528/487; 528/490; 528/491; 528/492; 528/503; 524/81; 524/115; 524/155; 524/167; 524/284; 524/297; 524/366
(58) Field of Search ..................... 528/486, 487, 528/490, 491, 492, 503; 524/81, 115, 155, 167, 284, 297, 366

(56) References Cited

U.S. PATENT DOCUMENTS

| 4,150,215 | 4/1979 | Kelley | 528/272 |
|---|---|---|---|
| 4,294,956 | * 10/1981 | Berger et al. | 528/179 |
| 4,296,232 | * 10/1981 | Maresca et al. | 528/179 |
| 4,418,188 | * 11/1983 | Smith et al. | 528/274 |
| 4,447,595 | * 5/1984 | Smith et al. | 528/274 |

OTHER PUBLICATIONS

W. A. Herrmann et al., Volatile Metal Alkoxides According to the Concept of Donor Functionalization, *Angew Chem. Int. Ed. Engl.*, 34, 2187–2206, 1995.

Kanak B. Dass et al., Solid State Polymerisation—A Review, 11, 39, 501–405, 1996.

H. A. Ghatta et al., Le Reazioni Allo Stato Solido, 1, 98, 33–42, 1996.

* cited by examiner

Primary Examiner—Samuel A. Acquah

(57) ABSTRACT

This invention concerns a process for the addition of volatile materials to prepolymers prior to or during solid state polymerization processes and the subsequent conducting of said solid state polymerization process.

13 Claims, No Drawings

ADDITION OF TREATMENT AGENTS TO SOLID PHASE POLYMERIZATION PROCESS

This application claims the priority of Provisional No. 60/120,393, filed on Feb. 17, 1999.

FIELD OF THE INVENTION

This invention concerns a process for the addition of volatile materials, such as catalysts or treatment agents, to prepolymers prior to or during solid state polymerization processes and the subsequent solid state polymerization process. Optionally, the volatile materials, having completed their function, may be removed from the polymer during or after the solid state polymerization process.

TECHNICAL BACKGROUND

Various publications describe the uses of and methods of using catalysts or other additives during a solid state polymerization process of condensation polymers.

In these polymerization processes, it has been customary to introduce the catalyst species into the melt phase of the polymerization process followed by solidification and, optionally, crystallization. Thus, when said catalyst treated polymer is subjected to solid state polymerization, the catalyst is available to exert its catalytic action. Catalyst remains in the finished, solid state polymerized product and all end use polymer products contain measurable quantities of the catalytic species. In any subsequent use, where the catalyst-containing polymer is exposed to heat, a molecular weight increasing condensation reaction may start to occur because the catalyst is still present.

The present invention adds the catalyst or other treatment agent as a gas or dissolved in a liquid, which improves the contact of the polymer, typically in the form of a particle or a pastille, with the catalyst or treatment material and, if the agent is sufficiently volatile, also facilitates removal of the agent from the system. The agent is then removed easily from the system after contact with the polymer by the inert gas sweep employed in solid state polymerization processes and the resulting polymerization product is substantially free of catalyst or treatment agent.

SUMMARY OF THE INVENTION

This invention provides a process for the addition of volatile treatment agents to a solid state polymerization in a condensation polymerization process comprising:

a) establishing a recirculating gas flow over polymer particles undergoing solid state polymerization;

b) introducing a volatile treatment agent into said recirculating gas flow; and c) contacting said polymer particles with said volatile treatment agent under solid phase polymerization conditions.

This invention further provides a process for the addition of volatile treatment agents to a solid state polymerization in a condensation polymerization process comprising:

a) contacting polymer particles with a solution of a volatile treatment agent in a suitable solvent;

b) removing said solvent to yield polymer particles coated with or containing said treatment agent;

c) subjecting said polymer particles to solid state polymerization in the presence of a gas flow.

This invention may be used with additive materials such as catalysts, treatment agents, catalyst deactivators, nucleating agents, antioxidants, ultraviolet stabilizing agents, plasticizers, thermal stabilizers, comonomers, tinting agents and barrier property enhancers. In some of these embodiments it is desirable to remove the additive material after contact with the polymer, although in some embodiments herein the additive is incorporated into the polymer as part of the final product.

DETAILED DESCRIPTION OF THE INVENTION

The process of the present invention applies to the polymerization of polymers where the polymerization process is subject to catalysis or other treatment. Suitable polymer types include polyesters, polyamides and polycarbonates, including homopolymers and copolymers of these various polymer types. The polymer to which the process of the present invention is applied typically has a degree of polymerization in the range of from 5 to 25.

In working with these polymers it has been customary to introduce the catalyst species into the melt phase of the polymerization process followed by solidification and crystallization.

According to the practice of the present invention, a catalyst or treatment material effective in solid state polymerization is introduced into the solid state polymerization stage via a gas stream that is introduced to, and vented from, the solid state polymerizer. It is also within the scope of the present invention to introduce the catalyst or treatment agent via a gas stream introduced to a preheater or conditioner vessel upstream of the solid phase polymerizer.

The catalyst or treatment material must be sufficiently volatile, i.e., it has a high enough vapor pressure, to be introduced via the gas stream, and, optionally, to also be removed via the gas stream. Thus, if desirable, by stopping the vapor borne supply of catalyst or treatment material, but continuing the vapor sweep through the solid state polymerization vessel, the amount of catalyst remaining in the subject polymer may be substantially reduced. This offers potential utility both in polymer purity and stability. In certain condensation polymers known in the art, residual catalyst lends itself to polymer instability, especially during the course of post-polymerization treatment steps or uses that involve exposure to elevated temperatures.

Alternatively, the additive may be introduced by use of a solution of the additive in a suitable solvent, followed by removal of said solvent. In this embodiment, polymer particles are contacted with the treatment agent, then after solvent removal, the coated polymer particles are subjected to solid state polymerization in the presence of a vapor sweep. If the agent is sufficiently volatile, and the solid state polymerization is sufficiently lengthy, the additive may be completely removed by the vapor sweep leading to the same potential advantages as described above for vapor state addition of volatile agents.

As mentioned above additives such as catalysts, treatment agents, catalyst deactivators, nucleating agents, antioxidants, ultraviolet stabilizing agents, plasticizers, thermal stabilizers, co-monomers, tinting agents and barrier property enhancers may be contacted with the polymer in the solid state polymerizer. Examples of catalyst additives useful herein include the following: benzene-sulfonic acid, methanesulfonic acid triflic acid (trifluoromethanesulfonic acid), toluene sulfonic acids, especially p-toluene sulfonic acid, other volatile Bronsted and Lewis acids, tetra isopropoxy titanate and tri butoxy antimonate. Volatile Bronsted acids are preferred. It is to be noted that Bronsted acids are generally not useful in conventional solid state polymerization processes of polyesters due to excessive dialkylene glycol formation.

Certain grades of polyester, such as for the bottle resin market, are typically polymerized to high molecular weight in the melt phase, i.e., to ~0.65 IV, and then subjected to post-polymerization solid phasing to raise the molecular weight even further to levels needed for bottle resins or for industrial fibers. Example 4 shows that the process of the present invention can be used to increase rates of this post polymerization solid phasing.

Viscosities reported below were obtained with a Viscotek Forced Flow Viscometer. Polyesters were dissolved in trifluoroacetic acid/methylene chloride. The viscosity data reported have been correlated to the intrinsic viscosity in 60/40 wt % phenol/tetrachloroethane following ASTM D4603-96.

EXAMPLES

Example 1

Catalyst-free polyethylene terephthalate pastilles having a degree of polymerization of about 20 were dried for 16 hours in a vacuum oven at 110° C. In a nitrogen-flushed drybox, 75 gram quantities of these pastilles were added to 160 mL of 0.3 molar solutions of various catalysts according to the table below. The mixture was refluxed for 60 minutes, distilling off 11 to 32 mL of solvent. The pastilles were then separated from the solution and washed with pentane and dried at reduced pressure for 16 hours.

Catalyst Solutions

| ID | Composition |
|----|-------------|
| A  | $Ti(O-i-Pr)_4$ in heptane |
| B  | $C_6H_5SO_3H$ in methylene chloride |
| C  | $Sb(OC_4H_9)_3$ in heptane |
| D  | Pure Heptane, with no catalyst (control) |

The pastilles were then solid-phase polymerized at 240° C. using a nitrogen purge for 24 hours. The IV results are summarized in the table below.

| Time | $Ti(O-i-Pr)_4$ | $C_6H_5SO_3H$ | $Sb(OC_4H_9)_3$ | Control |
|------|----------------|----------------|------------------|---------|
| $t_0$ (before SSP) | 0.162 | 0.159 | 0.166 | 0.165 |
| 5 minute | 0.176 | — | — | — |
| 1 hour | — | 0.263 | 0.181 | — |
| 2 hours | 0.285 | 0.511 | 0.313 | — |
| 4 hours | — | — | — | 0.171 |
| 6 hours | 0.419 | — | — | — |
| 24 hours | 0.625 | 0.988 | 0.457 | 0.215 |

These results show that the $C_6H_5SO_3H$ catalyst is the most active catalyst in this series under these conditions.

The pastilles treated with the $C_6H_5SO_3H$ catalyst analyzed for 1068 ppm S before solid phase polymerization and 145 ppm S after solid phase polymerization. A sample of these pastilles after solid phase polymerization was subjected to a vacuum oven at 110° C. for 16 hours which further reduced their sulfur content to 15 ppm S. A sample of these pastilles after solid phase polymerization was melted under vacuum for 60 minutes, which reduced their sulfur content to 130 ppm S. These results show that the absorption of the benzene sulfonic acid catalyst is reversible.

The pastilles treated with the $C_6H_5SO_3H$ catalyst analyzed for 1.1 weight % diethylene glycol before solid phase polymerization and 1.9 weight % diethylene glycol after solid phase polymerization. This data shows that the diethylene glycol remains within acceptable limits using this catalyst under these conditions.

Example 2

The polyethylene terephthalate oligomer used in this experiment contained 275 ppm Sb catalyst, had 2 mole % isophthalic acid comonomer, and possessed a degree of polymerization of 20. The pastilles weighed 16 mg/particle on average. The end group composition was 225 meq/kg of carboxyl groups with essentially all of the remainder being hydroxyl groups. Fifteen grams of this oligomer was solid-phase polymerized using dry nitrogen at 230° C. which had been passed over 3 grams of benzene sulfonic acid. The catalyst is added via the gas phase in this experiment. The total polymerization time was 24 hours. This sample is designated A in the table below. In a separate experiment, fifteen grams of this oligomer was exposed to a solution of 5 grams of benzene sulfonic acid in 100 mL of methylene chloride for 30 seconds. The pastilles were dried and solid phase polymerized as above. This sample is designated B in the table below. A third sample of these oligomer pastilles was solid phase polymerized as in the above procedure with no additional catalyst, as a control. This sample is designated C in the table below. The table shows the intrinsic viscosity as a function of time.

| SAMPLE: Time (hours) | A | B | C |
|----------------------|-------|-------|-------|
| 0  | 0.209 | 0.209 | 0.209 |
| 1  | 0.334 | 0.329 | 0.249 |
| 6  | 0.497 | 0.432 | 0.271 |
| 24 | 0.639 | 0.616 | 0.408 |

These results show that the gas phase catalyst addition provided the highest rate of polymerization in this series. The end group analysis after 24 hours of solid phasing of sample A, the one using the gas phase catalyst, shows 6 meq/kg of hydroxy end groups and 99 meq/kg of carboxyl end groups. This end group analysis shows that the hydroxy end groups are essentially depleted, limiting further molecular weight enhancement.

Example 3

The polyethylene terephthalate oligomer used in this experiment contained 275 ppm Sb catalyst, had 2 mole % isophthalic acid comonomer, and possessed a degree of polymerization of 20. The pastilles weighed 16 mg/particle on average. The end group composition was 225 meq/kg of carboxyl groups with essentially all of the remainder being hydroxyl groups. Fifteen grams of this oligomer was solid-phase polymerized using dry nitrogen at 230° C. which had been passed over 3 grams of benzene sulfonic acid. The catalyst is added in the gas phase in this experiment. The total polymerization time was 24 hours. This sample is designated A in the table below. In a separate experiment, fifteen grams of this oligomer was solid-phase polymerized using dry nitrogen at 230° C. which had been passed over 1.0 grams of benzene sulfonic acid, again adding catalyst in the gas phase as part of the nitrogen stream. This sample is designated as sample B in the table below. The table shows the intrinsic viscosity versus time.

| SAMPLE | A | B |
|---|---|---|
| time start | 0.209 | 0.209 |
| 1 hour | 0.282 | 0.366 |
| 6 hours | 0.471 | 0.549 |
| 24 hours | 0.741 | 0.727 |

This data shows that the smaller catalyst charge is sufficient to provide significant catalytic effects and that the effect of catalyst is very large in the first 6 hours of polymerization under these conditions with this catalyst.

Example 4

This example demonstrates the addition of catalyst after melt phase polymerization as a means of enhancing the rate of subsequent solid phase polymerization.

Crystar® Merge 3934 polyethylene terephthalate is a typical commercial grade high molecular weight polyester prepared in a melt process using antimony trioxide as catalyst. It is obtainable from E. I. du Pont de Nemours and Company, Wilmington, Del. In this experiment the polymer used was in the form of pellets that had been first crystallized by heating to 160° C. for 5 hours. Fifteen gram aliquots of these pellets were soaked for 3 minutes in a solution consisting of 5.0 g of benzene sulfonic acid in 100 mL of methylene chloride. The catalyst solution was drained off of the pellets and then the pellets were dried under vacuum. The catalyst coated pellets were solid state polymerized using a dry nitrogen stream. The inherent viscosity results are tabulated below. These data show that treatment of the pellets of melt phase polymerized polyester with catalyst in this way enhances the rate of solid state polymerization.

| Sample | Temperature | Inherent Viscosity | | | |
|---|---|---|---|---|---|
| | | 0 hrs | 1 hr | 6 hrs | 24 hrs |
| no added catalyst | 230° C. | 0.73 | 0.770 | 0.871 | 1.025 |
| no added catalyst | 240° C. | 0.73 | 0.758 | 0.892 | 1.039 |
| Benzene sulfonic acid catalyst | 230° C. | 0.73 | 0.724 | 0.852 | 1.100 |
| Benzene sulfonic acid catalyst | 240° C. | 0.73 | 0.778 | 0.889 | 1.174 |

Example 5

The procedure of Example 2 was repeated except with a pre-polymer low in acid end groups and rich in ethylene glycol end groups. This oligomer had an initial acid end group concentration of 77 meq/kg and an initial ethylene glycol end group concentration of 552 meq/kg. In contrast, the control had an acid end group concentration of 225 meq/kg, with the remaining end groups being ethylene glycol end groups. The inherent viscosity as a function of time in solid stating is tabulated below. These data show that solid-phase polymerization is faster at these lower ethylene glycol end group concentrations.

| Time(hrs) | Temp.(° C.) | IV(Low Carboxyls) | IV(High Carboxyls) |
|---|---|---|---|
| 0.0 | 240 | 0.26 | 0.25 |
| 1.0 | 240 | 0.52 | 0.35 |
| 6.0 | 240 | 0.67 | 0.49 |
| 24.0 | 240 | 0.92 | 0.64 |
| 0.0 | 230 | 0.26 | 0.25 |
| 1.0 | 230 | 0.42 | 0.31 |
| 6.0 | 230 | 0.63 | 0.45 |
| 24.0 | 230 | 0.81 | 0.61 |
| 0.0 | 220 | 0.26 | 0.25 |
| 1.0 | 220 | 0.43 | 0.31 |
| 6.0 | 220 | 0.56 | 0.40 |
| 24.0 | 220 | 0.70 | 0.52 |

What is claimed is:

1. A process for the addition of volatile treatment agents to a solid state polymerization, in a condensation polymerization process, comprising:
   a) establishing a recirculating gas flow over polymer particles undergoing solid state polymerization;
   b) introducing a volatile treatment agent into said recirculating gas flow; and
   c) contacting said polymer particles with said volatile treatment agent under solid phase polymerization conditions.

2. A process for the addition of volatile treatment agents to a solid state polymerization in a condensation polymerization process comprising:
   a) contacting polymer particles with a solution of a volatile treatment agent in a suitable solvent;
   b) removing said solvent to yield polymer particles coated with or containing said treatment agent; and
   c) subjecting said polymer particles to solid state polymerization in the presence of a gas flow.

3. The process of claim 1 or 2 wherein the treatment agent is selected from the group consisting of catalysts, treatment agents, catalyst deactivators, nucleating agents, antioxidants, ultraviolet stabilizing agents, plasticizers, thermal stabilizers, comonomers, tinting agents and barrier property enhancers.

4. The process of claim 3 wherein the treatment agent is a catalyst.

5. The process of claim 4 wherein the catalyst is a Bronsted acid or a Lewis acid.

6. The process of claim 4 wherein the catalyst is selected from the group consisting of benzenesulfonic acid, methanesulfonic acid triflic acid (trifluoromethanesulfonic acid), toluene sulfonic acid, tetra isopropoxy titanate and tri tert butoxy antimonate.

7. The process of claim 5 wherein the catalyst is a Bronsted acid.

8. The process of claim 6 wherein the catalyst is p-toluene sulfonic acid.

9. The condensation polymerization process of claim 1 or 2 wherein the condensation polymer is selected from the group consisting of homopolymers and copolymers of polyesters, polyamides and polycarbonates.

10. The process of claim 4 wherein the condensation polymer is selected from the group consisting of poly (ethylene terephthalate) and poly(trimethylene terephthalate).

11. The process of claim 1 or 2 wherein the polymer undergoing solid state polymerization has a degree of polymerization in the range of from 5 to 25.

12. The process of claim 1 or 2 further comprising the step of removing said volatile treatment agent at the conclusion of the solid state polymerization.

13. In a process for the solid state polymerization of a condensation polymer in the presence of a gas flow and in the presence of a volatile treatment agent, the improvement comprising removing the volatile treatment agent at the conclusion of the solid state polymerization.

* * * * *